US011027600B2

(12) United States Patent
Schneider et al.

(10) Patent No.: US 11,027,600 B2
(45) Date of Patent: Jun. 8, 2021

(54) REINFORCEMENT ELEMENT FOR A VEHICLE, METHOD FOR PRODUCING THE SAME AND DOOR ASSEMBLY

(71) Applicant: ArcelorMittal, Luxembourg (LU)

(72) Inventors: Nicolas Schneider, Saint-Martin-Longueau (FR); Yves Drouadaine, Pontoise (FR)

(73) Assignee: ARCELORMITTAL, Luxembourg (LU)

( * ) Notice: Subject to any disclaimer, the term of this patent is extended or adjusted under 35 U.S.C. 154(b) by 742 days.

(21) Appl. No.: 16/305,503

(22) PCT Filed: Sep. 22, 2015

(86) PCT No.: PCT/IB2015/057283
§ 371 (c)(1),
(2) Date: Nov. 29, 2018

(87) PCT Pub. No.: WO2016/046736
PCT Pub. Date: Mar. 31, 2016

(65) Prior Publication Data
US 2021/0114442 A1 Apr. 22, 2021

(30) Foreign Application Priority Data

Sep. 22, 2014 (WO) .................. PCT/IB2014/064734

(51) Int. Cl.
*B60J 5/04* (2006.01)
*B21D 22/02* (2006.01)
(Continued)

(52) U.S. Cl.
CPC .......... *B60J 5/0444* (2013.01); *B21D 22/022* (2013.01); *B21D 37/16* (2013.01); *B21D 47/00* (2013.01);
(Continued)

(58) Field of Classification Search
CPC .......... B60J 5/0425; B60J 5/044; B60J 5/048; B21D 22/022; B21D 37/16; B21D 47/00; B21D 53/88
(Continued)

(56) References Cited

U.S. PATENT DOCUMENTS 3,868,796 A * 3/1975 Bush ........................ B60J 5/045
52/783.12
4,838,606 A 6/1989 Furubayashi et al.
(Continued)

FOREIGN PATENT DOCUMENTS

| CA | 2624960 | 4/2007 |
| CA | 2850012 A1 | 4/2013 |

(Continued)

OTHER PUBLICATIONS

Fine T E et al: "Development of Lightweight Door Intrusion Beams Utilizing an Ultra High Strength Steel", SAE Transactions. SAE. New York. US. Feb. 24, 1975 (Feb. 24, 1975).

*Primary Examiner* — Jason S Morrow
(74) *Attorney, Agent, or Firm* — Davidson, Davidson & Kappel, LLC

(57) ABSTRACT

The reinforcement element for reinforcing the structure of a door of a vehicle extends along a main direction and comprises at least a main portion having a reinforcing cross-section (40) extending in a plane substantially perpendicular to the main direction. The reinforcing cross-section (40) includes at least four adjacent branches (42*a*, 42*b*, 42*c*, 42*d*, 42*e*, 42*f*, 42*g*), each extending in different directions, two successive branches forming a non-zero angle, at least two of the non-zero angles being of opposite signs.

12 Claims, 3 Drawing Sheets

(51) Int. Cl.
  *B21D 37/16*  (2006.01)
  *B21D 53/88*  (2006.01)
  *B21D 47/00*  (2006.01)

(52) U.S. Cl.
  CPC .............. *B21D 53/88* (2013.01); *B60J 5/048* (2013.01); *B60J 5/0425* (2013.01); *B60J 5/0461* (2013.01); *B60J 5/0448* (2013.01)

(58) Field of Classification Search
  USPC ...................................................... 296/146.6
  See application file for complete search history.

(56) References Cited

U.S. PATENT DOCUMENTS

| | | |
|---|---|---|
| 5,887,938 A | 3/1999 | Toepker et al. |
| 5,992,922 A | 11/1999 | Harbig et al. |
| 6,663,169 B2 | 12/2003 | Gehringhoff et al. |
| 2007/0095001 A1 | 5/2007 | Heatherington et al. |
| 2007/0145770 A1 | 6/2007 | Katau |
| 2012/0285098 A1 | 11/2012 | Rakei |
| 2013/0088037 A1 | 4/2013 | Schurter et al. |
| 2014/0027026 A1 | 1/2014 | Schwinghammer et al. |
| 2014/0246879 A1 | 9/2014 | Ishigame et al. |
| 2014/0319869 A1 | 10/2014 | Baskar |
| 2016/0368352 A1 | 12/2016 | Tsukamoto |
| 2017/0210211 A1 | 7/2017 | Clausen |
| 2017/0326954 A1 | 11/2017 | Peidro Aparici |
| 2020/0094885 A1* | 3/2020 | Kubo ..................... C21D 1/673 |

FOREIGN PATENT DOCUMENTS

| | | |
|---|---|---|
| CN | 101374615 A1 | 2/2009 |
| DE | 29622985 U1 | 10/1997 |
| DE | 19647334 A1 | 5/1998 |
| DE | 102012002917 A1 | 8/2013 |
| EP | 1200278 B1 | 5/2002 |
| EP | 1266780 A1 | 12/2002 |
| EP | 1420968 B1 | 5/2004 |
| JP | 2002102980 A | 4/2002 |
| JP | 2014024074 A | 2/2014 |
| WO | 01/03960 | 1/2001 |
| WO | 03018338 | 3/2003 |
| WO | 2012085253 A2 | 6/2012 |

* cited by examiner

REINFORCEMENT ELEMENT FOR A VEHICLE, METHOD FOR PRODUCING THE SAME AND DOOR ASSEMBLY

The present invention concerns a reinforcement element for reinforcing the structure of a door of a vehicle, said reinforcement element extending along a main direction and comprising at least a main portion having a reinforcing cross-section extending in a plane substantially perpendicular to the main direction.

BACKGROUND

There is a general demand for automotive vehicle body structures which provide a high degree of safety for the occupants during collisions and other situations involving very high loads due to impact forces acting on the vehicle.

In order to obtain a high degree of safety for the occupants of a vehicle, the body structure of the vehicle must be designed so as to provide a high strength and a high resistance to impact forces, by absorbing and distributing the impact forces in an effective manner. This is generally achieved by means of various reinforcement structures and components in the vehicle.

In particular, in order to minimize the safety hazard caused by an intrusion into the passenger compartment in a side impact accident, it is known to provide the doors of a vehicle with structural reinforcement elements, in the form of beams or other reinforcement components which are suitably arranged inside the door, i.e. between the inner and outer panels of the door. In this manner, the structural reinforcements provide absorption and distribution of impact forces during a collision, in particular involving a side impact against the doors.

When designing such a reinforcement element, several requirements, often conflicting with each other, must be complied with. Indeed, it is desirable to optimize the performance of the reinforcement element so as to insure the absorption of an important quantity of energy during the absorption of impact loads, principally bending loads and a significant deflection before failure. At the same time, the reinforcement element, placed between the inner and outer panels of the door, should have a relatively small cross-section, in order to avoid interferences with other structures and mechanisms also placed within the door, for example the door glass when the door window is open and the mechanisms used to operate the door glass.

Furthermore, it is desirable to reduce the overall weight of the vehicle, in order to reduce the energy consumption of the vehicle, so as to meet the future environment requirements.

SUMMARY OF THE INVENTION

It is an object of the present invention to provide a reinforcement element having reduced thickness and weight and still insuring an improved resistance to side impacts.

To that end, the invention relates to a reinforcement element for reinforcing the structure of a door of a vehicle, said reinforcement element extending along a main direction and comprising at least a main portion having a reinforcing cross-section extending in a plane substantially perpendicular to the main direction, characterized in that the reinforcing cross-section comprises at least four adjacent branches, each extending in different directions, two successive branches forming a non-zero angle, at least two of said non-zero angles being of opposite signs.

In particular, the invention relates to a reinforcement element for reinforcing the structure of a door of a vehicle, said reinforcement element extending along a main direction and comprising at least a main portion having a reinforcing cross-section extending in a plane substantially perpendicular to the main direction, characterized in that the reinforcing cross-section comprises at least four adjacent branches, each extending in different directions, two successive branches forming a non-zero angle, at least two of said non-zero angles being of opposite signs, said adjacent branches comprising a first branch, a second branch and a third branch, said first branch forming with said second branch a first non-zero angle, said second branch forming with said third branch a second non-zero angle, the first non-zero angle and the second non-zero angle being of the same sign, the first branch and the second branch being joined together by a first arcuate junction, the second branch and the third branch being joined together by a second arcuate junction, the radiuses of curvature of said first arcuate junction and said second arcuate junction being substantially comprised between 5 mm and d/2, wherein d is a distance between said first branch and said third branch.

The first branch extends substantially in a first plane, the second branch extends substantially in a second plane, and the third branch extends substantially in a third plane, the first plane and the second plane intersecting along a first intersection line, and the second plane and the third plane intersecting along a second intersection line, the first and second intersection lines being substantially parallel. d is the distance between the first intersection line and the second intersection line.

Owing to the geometry of the main section, the reinforcement element may absorb an important amount of energy before bending and thus provides an improved resistance to impacts, as compared to planar reinforcement elements, without requiring a large cross-section.

According to other advantageous aspects of the invention, the reinforcement element comprises one or more of the following features, considered alone or according to any technically possible combination:
- at least part of the main portion is made of a press hardening steel having a tensile strength higher than or equal to 1300 MPa;
- the press hardening steel is Usibor®;
- in the reinforcing cross-section comprises at least five adjacent branches, each extending in different directions, a first branch forming with a second branch a first non-zero angle, the second branch forming with a third branch a second non-zero angle, the third branch forming with a fourth branch a third non-zero angle, the fourth branch forming with a fifth branch a fourth non-zero angle, said first and second angles being of the same sign, said third and fourth angles being of a sign opposite to the sign of the first and second angles;
- the non-zero angles are substantially comprised, in absolute value, between 80° and 90°;
- two successive branches are joined together by an arcuate junction;
- the radius of curvature of the arcuate junction is substantially comprised between 5 mm and 15 mm;
- the length of at least one of the branches and/or the absolute value of at least one of the angles of the reinforcing cross-section vary along the main direction.

The invention also relates to a door assembly of a vehicle, comprising a door structure comprising a window frame and a door panel, characterized in that it further comprises a reinforcement element according to the invention extending across the door panel.

According to other advantageous aspects of the invention, the door assembly comprises one or more of the following features, considered alone or according to any technically possible combination:
- the door structure is made of a metallic material different from the material of the reinforcement element;
- the door panel is delimited by a front edge, a rear edge substantially parallel to the front edge, a lower edge and an upper edge extending between the ends of the front edge and the rear edge, said upper edge defining an edge of the window frame, the reinforcement element extending from the front edge to the rear edge between the upper edge and the lower edge and being substantially parallel to the upper edge.

The invention also relates to a vehicle comprising a door assembly according to the invention.

The invention also relates to a method for producing a reinforcement element according to the invention, comprising the following steps:
- hot stamping a reinforcement element blank to shape the reinforcement cross section of the main portion,
- cooling down the reinforcement element at a cooling rate superior or equal to 27° C./s in order to obtain a structure consisting of martensite.

BRIEF DESCRIPTION OF THE DRAWINGS

Other features and advantages of the invention will be better understood from a reading of the following description, given with reference to the appended drawings, in which.

DETAILED DESCRIPTION

In the following description, the terms inner, outer, front, rear, transversal, longitudinal, vertical and horizontal are construed with reference to the usual orientation of the illustrated elements, parts or structures when assembled on a vehicle structure.

Figure 1:
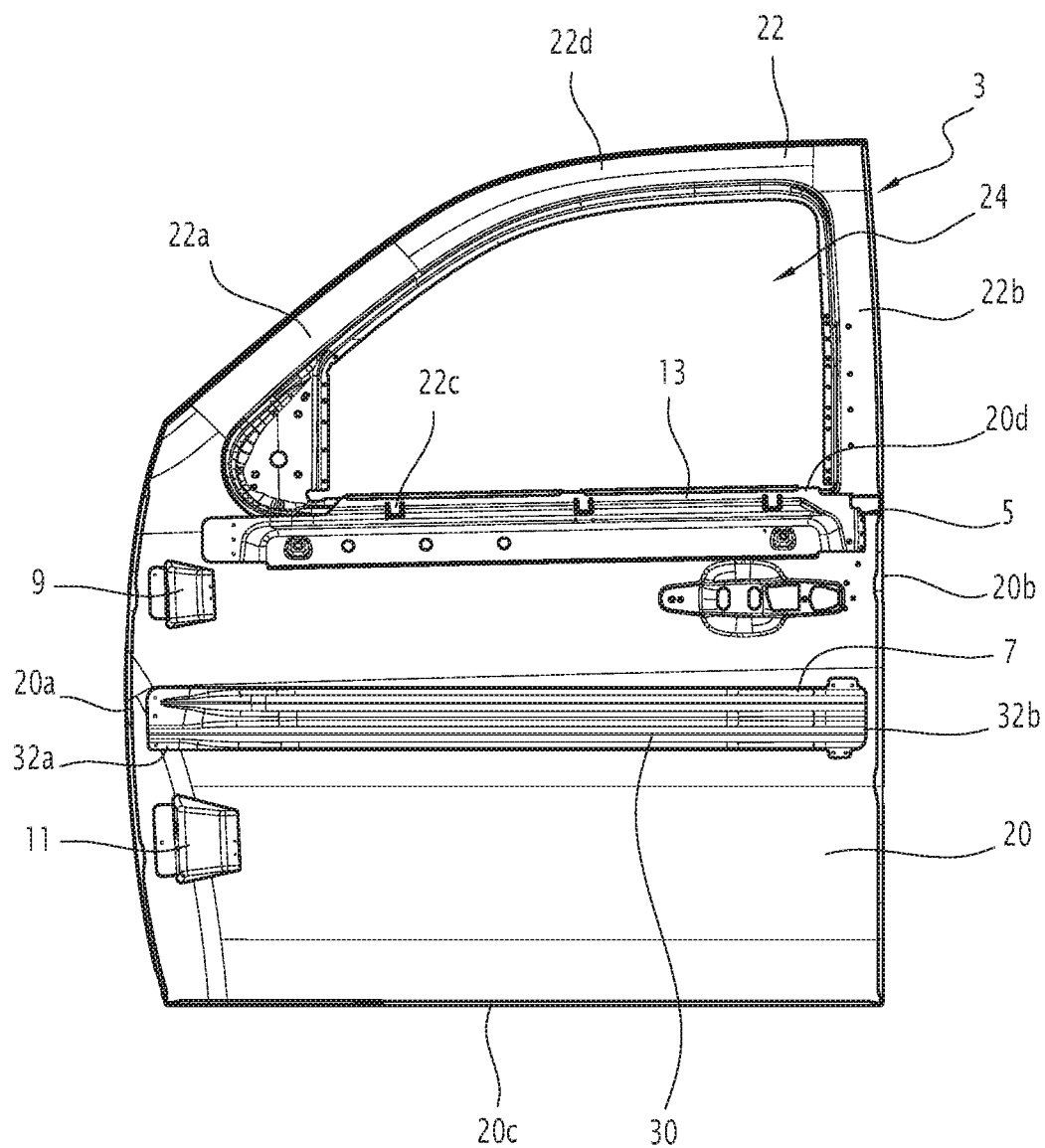
FIG. 1 shows a door assembly according to a particular embodiment.

A door assembly 3 of an automotive vehicle according to an embodiment is illustrated on FIG. 1.

The door assembly 3 of this exemplary embodiment is a front driver-side door of a passenger vehicle, for example a pickup truck.

The door assembly 3 comprises a door structure 5 and a reinforcement element 7. The door assembly 3 further comprises hinge reinforcement elements 9 and 11, and a waist reinforcement element 13.

The door structure 5 comprises a door panel 20 and a window frame 22.

The door panel 20 is a door inner panel, which is destined to be joined to a door outer panel (not represented). When joined together, the door inner panel 20 and the door outer panel define a central space having a front which faces the front of the vehicle and a back which faces the back of the vehicle.

The door inner panel 20 is delimited by a front edge 20a, a rear edge 20b, a lower edge 20c and an upper edge 20d. The front edge 20a and the rear edge 20b are substantially parallel to each other, and extend in a substantially vertical direction. The lower edge 20c and the upper edge 20d extend between the ends of the front edge 20a and the rear edge 20b. The lower edge 20c and the upper edge 20d are substantially parallel to each other, and extend in a substantially horizontal direction.

The window frame 22 defines an opening 24 destined to receive a door glass. The window frame 22 is delimited by a front edge 22a, a rear edge 22b, a lower edge 22c and an upper edge 22d. The lower edge 22c is defined by the upper edge 20d of the door inner panel 20. The lower edge 22c and the upper edge 22d are substantially parallel to each other, and extend in a substantially horizontal direction. The front edge 22a and the rear edge 20b extend between the ends of the lower edge 22c and the upper edge 22d. The rear edge 20b extends in a substantially vertical direction. The front edge 22a extends frontward and downward, in an oblique direction, from the front end of the upper edge 22d to the front end of the lower edge 22c. The front edge 22a, the rear edge 22b, the lower edge 22c and the upper edge 22d define the opening 24.

For example, the window frame 22 is made integral with the door inner panel 20.

The door inner panel 20 and the window frame 22 are made of steel, for example a high formability steel. The steel may be coated or uncoated.

For example, the door inner panel 20 has a thickness of 0.65 mm.

For example, the window frame 22 has a thickness of 1.1 mm.

The door structure 5 is for example produced by stamping a laser welded blank, which is formed by assembling several blanks by welding.

The waist reinforcement element 13 is attached to the door inner panel 20 at the front edge 20a, for example by welding or bolting.

The waist reinforcement element 13 is made of steel, for example of a cold formed steel having a tensile strength comprised between 390 MPa and 450 MPa and a yield strength comprised between 300 MPa and 360 MPa.

The hinge reinforcement elements 9 and 11 comprise an upper hinge reinforcement element 9 and a lower hinge reinforcement element 11. The upper and lower hinge reinforcement elements 9 and 11 are attached to the door inner panel 20, on the outer side of the door inner panel 20, so as to be received within the central space formed between the door inner panel 20 and the door outer panel.

The upper and lower hinge reinforcement elements 9 and 11 provide reinforcement to the door inner panel 20 in the areas of the hinges which join the door assembly 3 to the vehicle body.

The upper and lower hinge reinforcement elements 9 and 11 are made of steel, preferably of a press hardened steel which, once pressed, has a tensile strength higher than or equal to 1300 MPa.

For example, the press-hardened steel has a composition comprising, in % weight, $0.10\% \leq C \leq 0.5\%$, $0.5\% \leq Mn \leq 3\%$, $0.1\% \leq Si \leq 1\%$, $0.01\% \leq Cr \leq 1\%$, $Ti \leq 0.2\%$, $Al \leq 0.1\%$, $S \leq 0.05\%$, $P \leq 0.1\%$, $0.0005\% \leq B \leq 0.010\%$, the remainder consisting of iron and unavoidable impurities resulting from the production.

The press hardened steel is for example Usibor®, in particular Usibor®1500 or Usibor®2000.

The steel may be coated or uncoated.

The reinforcement element 7 is in the form of a door beam.

In the event of a side impact collision, the reinforcement element 7 is destined to absorb energy from the impact forces to prevent collapse and failure of the other portions of the door assembly 3, so as to protect the occupants of the vehicle.

When attached to the door inner panel 20, the reinforcement element 7 extends across the door inner panel 20, lengthwise between the front edge 20a and the rear edge 20b. When the door inner panel 20 and the door outer panel are joined together, the reinforcement element 7 extends across lengthwise between the front and the rear of the central space formed between the door inner panel 20 and the door outer panel.

The reinforcement element 7 extends between the front edge 20a and the rear edge 20b along a main direction, for example along a substantially horizontal longitudinal direction.

The reinforcement element 7 is thus substantially parallel to the upper edge 20d or the door inner panel 20.

The reinforcement element 7 comprises a main portion 30 and two end portions, namely a front end portion 32a and a rear end portion 32b. The main portion 30 extends between the front and rear end portions 32a, 32b.

The reinforcement element 7 is destined to be attached to the door inner panel 20 by means of the front and rear end portions 32a, 32b, for example by welding.

The main portion 30 generally comprises an inner face, destined to be oriented towards the door inner panel 20 when the reinforcement element 7 is attached to the door inner panel 20, and an outer face, destined to be oriented towards the door outer panel.

Figure 2:
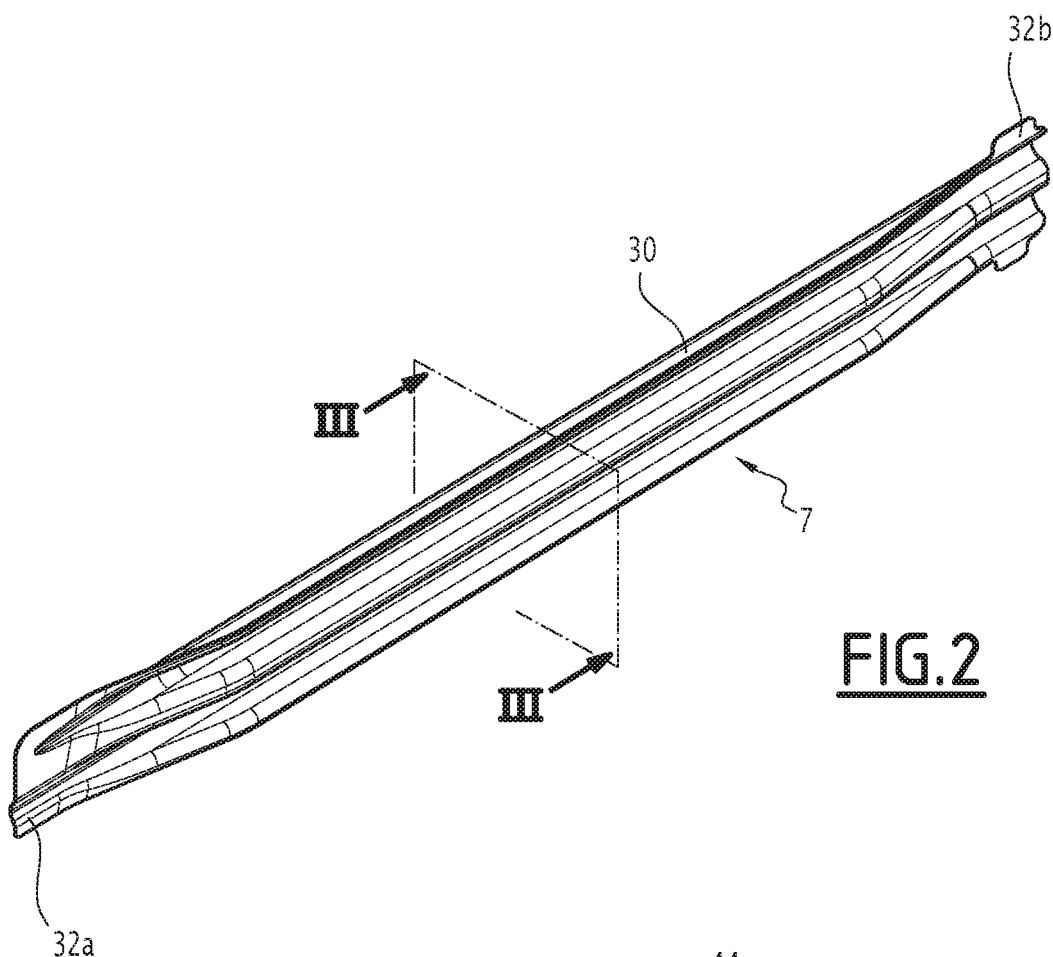
FIG. 2 shows a perspective view of a reinforcement element of the door assembly of FIG. 1.
Figure 3:
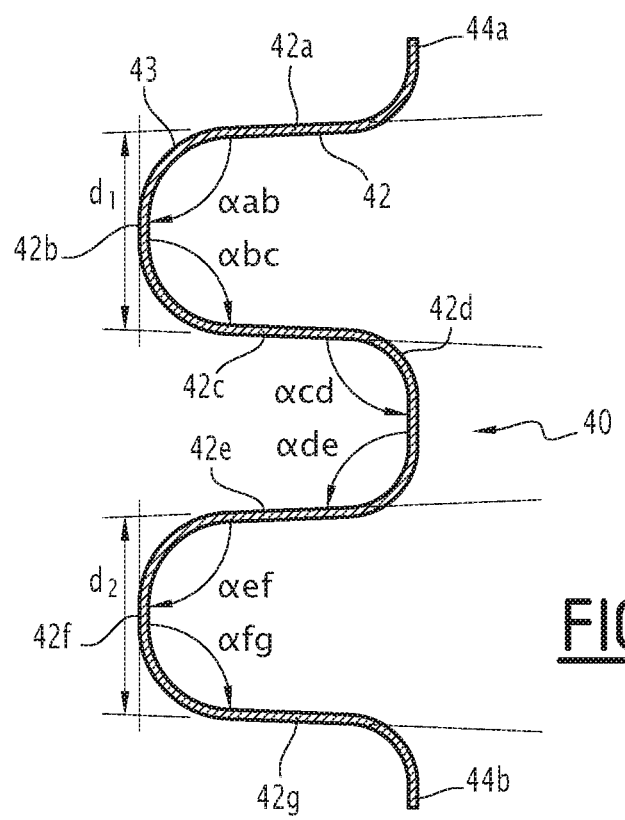
FIG. 3 shows a cross-section along line III-III of the reinforcement element of FIG. 2.
Figure 4:
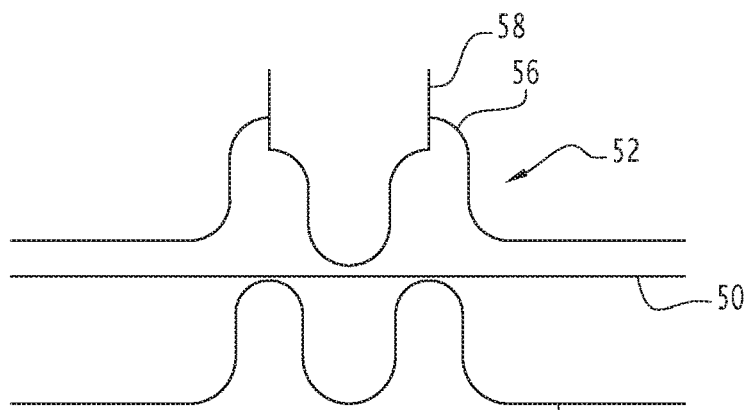
FIGS. 4 to 8 illustrate successive steps of a method for producing the reinforcement element of FIG. 2.

As shown in more details on FIGS. 2 and 3, the main portion 30 has a reinforcing cross-section 40 extending in a plane substantially perpendicular to the main direction.

The reinforcing cross-section 40 generally comprises at least four adjacent branches 42, each extending in different directions, each set of two successive branches forming a non-zero angle, at least two of said non-zero angles being of opposite signs.

The reinforcing cross-section 40 thus has a folded shape.

Owing to this folded shape, when the reinforcement element 7 is subjected to an impact, it first unfolds before bending. Therefore, the reinforcement element 7 protects the occupants of the vehicle by avoiding intrusions into the passenger compartment and may absorb a great quantity of energy, firstly by unfolding, and then by bending.

Preferably, the non-zero angles are substantially comprised, in absolute value, between 80° and 90°, preferably between 85° and 90°.

Owing to the high value of the non-zero angles, unfolding the reinforcement element 7 requires an important quantity of energy, so that during an impact, the reinforcement element 7 may absorb an important quantity of energy before bending.

Furthermore, as explained in further details below, the adjacent branches 42 comprise a first branch, a second branch and a third branch, the first branch forming with the second branch a first non-zero angle, the second branch forming with the third branch a second non-zero angle, the first non-zero angle and the second non-zero angle between of the same sign. The first branch extends substantially in a first plane, the second branch extends substantially in a second plane, and the third branch extends substantially in a third plane, the first, second and third planes being distinct.

The first branch and the second branch are joined together by a first arcuate junction, and the second branch and the third branch are joined together by a second arcuate junction.

Such arcuate junctions indeed provide a lower stress concentration coefficient Kt than an acute junction.

The radiuses of curvature of the first and second arcuate junctions are substantially comprised between 5 mm and d/2, d being the distance between the first branch and the third branch. This distance d is the distance between the first and third planes as measured in the second plane.

More specifically, the first plane and the second plane intersect along a first intersection line, and the second plane and the third plane intersect along a second intersection line. The first and second intersection lines are substantially parallel. The distance d is thus the distance between the first intersection line and the second intersection line.

For example, the distance d, as defined above, between the first and the third branch is 30 mm. In this example, the radiuses of curvature of the first and second arcuate junctions are substantially comprised between 5 mm and 15 mm.

Owing to this value of the radiuses of curvature, a reinforcement element 7 having satisfactory and uniform mechanical properties can be obtained.

Indeed, as disclosed in further details below, the reinforcement element 7 is for example produced by hot stamping a substantially planar reinforcement element blank. During the stamping, owing to the selected values of the radiuses of curvature, the contact surface between the dies and the areas of the reinforcement element blank which have not been shaped yet is minimized. Thus, the heat transfer which may otherwise occur between these areas and the dies is reduced, which prevents these areas from an uncontrolled cooling which may result in poor and/or non uniform mechanical properties.

The adjacent branches 42 further include a fourth branch forming with the third branch a third non-zero angle, the third non-zero angle being of a sign opposite to the sign if the first and second non-zero angles. Preferably, the third and fourth branches are also joined together by an arcuate junction 43.

The main portion 30 may have a variable cross section. For example, the length of at least one of the branches 42 and/or the absolute value of at least one of the angles of the reinforcing cross-section 40 may vary along the main direction.

In the example illustrated on FIGS. 2 and 3, the reinforcing cross-section 40 comprises seven branches: a first branch 42a, a second branch 42b which is adjacent to the first branch 42a, a third branch 42c which is adjacent to the second branch 42b, a fourth branch 42d which is adjacent to the third branch 42c, a fifth branch 42e which is adjacent to the fourth branch 42d, a sixth branch 42f which is adjacent to the fifth branch 42e and a seventh branch 42f which is adjacent to the sixth branch 42e.

The reinforcing cross-section further comprises two legs 44a, 44b joined respectively to the first branch 42a and the seventh branch 42g and forming with the first branch 42a and the seventh branch 42g respectively non-zero angles.

For example, the reinforcing cross-section 40 is symmetrical about a substantially horizontal line which passes in the middle of the fourth branch 42d.

The branches 42a, 42b, 42c, 42d, 42e, 42f extend in different directions.

Indeed, each branch 42 forms with each adjacent branch a non-zero oriented angle. Thus, the first branch 42a forms with the second branch 42b a first angle $\alpha_{ab}$, the second branch 42b forms with the third branch 42c a second angle $\alpha_{bc}$, the third branch 42c forms with the fourth branch 42d a third angle $\alpha_{cd}$, the fourth branch 42d forms with the fifth branch 42e a fourth angle $\alpha_{de}$, the fifth branch 42e forms with the sixth branch 42f a fifth angle $\alpha_{ef}$ and the sixth branch 42f forms with the seventh branch 42g a sixth angle $\alpha_{fg}$, the angles being non-zero angles.

The first branch extends substantially in a first plane, the second branch extends substantially in a second plane, the third branch extends substantially in a third plane, the fourth branch extends substantially in a fourth plane, the fifth branch extends substantially in a fifth plane, the sixth branch extends substantially in a sixth plane and the seventh branch extends substantially in a seventh plane.

For example, the first 42a, the third 42c, the fifth 42e and the seventh 42g branches are substantially horizontal, and the second 42b, fourth 42d and sixth 42f branches are substantially vertical. Thus, the first, third, fifth and seventh planes are substantially parallel. The second and the sixth planes are substantially the same, and parallel to the fourth plane.

Each branch is preferably joined to the adjacent branch (es) by an arcuate junction.

The first branch 42a and the second branch 42b are joined together by a first arcuate junction, the second branch 42b and the third branch 42c are joined together by a second arcuate junction, the third branch 42c and the fourth branch 42d are joined together by a third arcuate junction, the fourth branch 42d and the fifth branch 42e are joined together by a fourth arcuate junction, the fifth branch 42e and the sixth branch 42f are joined together by a fifth arcuate junction, and the sixth branch 42f and the seventh branch 42g are joined together by a sixth arcuate junction.

The first $\alpha_{ab}$, second $\alpha_{bc}$, fifth $\alpha_{ef}$ and sixth $\alpha_{fg}$ angles have the same sign, whereas the third $\alpha_{cd}$ and fourth $\alpha_{de}$ have a sign opposite to the first $\alpha_{ab}$, second $\alpha_{bc}$, fifth $\alpha_{ef}$ and fourth $\alpha_{fg}$ angles.

Thus, the first 42a, second 42b and third 42c branches together form a concave curve oriented towards a first direction, for example towards the door inner panel 20. The third 42c, fourth 42d and fifth 42e branches together form a concave curve oriented towards a second direction opposite the first direction, i.e. towards the door outer panel. The fifth 42e, sixth 42f and seventh 42g branches together form a concave curve oriented towards the first direction.

The arcuate junctions joining the first 42a, the second 42b and the third 42c branches, i.e. the first and second arcuate junctions, are oriented towards the first direction. Similarly, the arcuate junctions joining the fifth 42e, sixth 42f and seventh 42g branches, i.e. the fifth and the sixth arcuate junctions, are oriented towards the first direction.

The arcuate junctions joining the third 42c, fourth 42d and fifth 42e branches are oriented towards the second direction.

The radiuses of curvature of the first and the second arcuate junctions are substantially comprised between 5 mm and $d_1/2$, $d_1$ being the distance between the first branch 42a and the third branch 42c. This distance $d_1$ is the distance between the first and third planes as measured in the second plane. In particular, as explained above, the first plane and the third plane intersecting the second plane along two substantially parallel intersection lines, the distance $d_1$ is the distance between these two intersection lines, as shown on FIG. 3.

Similarly, the radius of curvature of the fifth and the sixth arcuate junctions are substantially comprised between 5 mm and $d_2/2$, $d_2$ being the distance between the fifth branch 42e and the seventh branch 42g. This distance $d_2$ is the distance between the fifth and seventh planes as measured in the sixth plane. In particular, the fifth plane and the seventh plane intersecting the sixth plane along two substantially parallel intersection lines, the distance $d_2$ is the distance between these two intersection lines.

The first, second, fifth and sixth arcuate junctions preferably have a radius of curvature comprised between 5 mm and 15 mm, in particular if the distances $d_1$ and $d_2$ are of about 30 mm.

For example, the radius of curvature of the third and fourth arcuate junctions is also comprised between 5 mm and 15 mm.

For example, the radius of curvature of the arcuate junctions oriented towards the door inner panel 20, i.e. of the first, second fifth and sixth arcuate junctions, is greater than the radius of curvature of the arcuate junctions oriented towards the door outer panel, i.e. the third and fourth arcuate junctions.

For example, the radius of curvature of the arcuate junctions oriented towards the inside of the vehicle is substantially equal to 11 mm and the radius of curvature of the arcuate junctions oriented towards the outside of the vehicle is substantially equal to 8 mm.

The main portion 30 has a thickness, defined as the dimension of the main portion along a transversal direction, comprised between 0.6 mm and 3 mm, for example comprised between 1 mm and 1.5 mm.

Owing to the folded geometry of the reinforcing cross-section 40, the main portion 30 has an overall thickness, defined as the thickness of the convex envelop of the main portion 30, superior to the thickness of the main portion 30 along a transversal direction, for example comprised between 30 mm and 40 mm, for example 36 mm.

However, this overall thickness remains small enough so that the reinforcement element may be fitted in the central space defined between the door inner panel 20 and the door outer panel without interfering with other structures and mechanisms also placed within the central space.

Preferably, the main portion 30 of the reinforcement element 7 is made of a press hardening steel which, once pressed, has a tensile strength higher than or equal to 1300 MPa.

For example, the press-hardened steel has a composition comprising, in % weight, $0.10\% \leq C \leq 0.5\%$, $0.5\% \leq Mn \leq 3\%$, $0.1\% \leq Si \leq 1\%$, $0.01\% \leq Cr \leq 1\%$, $Ti \leq 0.2\%$, $Al \leq 0.1\%$, $S \leq 0.05\%$, $P \leq 0.1\%$, $0.0005\% \leq B \leq 0.010\%$, the remainder consisting of iron and unavoidable impurities resulting from the production.

The press hardened steel is for example Usibor®, in particular Usibor®1500 or Usibor®2000.

The steel may be coated or uncoated.

Preferably, the press-hardened steel has a structure consisting essentially of ferrite and perlite before the steel is pressed, and a structure consisting of martensite after pressing.

Thus, the main portion 30 of the reinforcement element 7 is made of a steel having a structure consisting of martensite.

The reinforcement element 7 is for example produced by hot stamping a reinforcement element blank. The reinforcement element blank is a substantially planar blank having a shape adapted so that it may be hot stamped to form the reinforcement element 7.

A hot stamping process to shape the reinforcement element 7 is illustrated on FIGS. 4 to 8.

A reinforcement element blank 50 is first heated to a suitable temperature, for example 900° C., and placed in a double-action press 52 including a lower die 54, a whipper die 56 and a punch 58.

Initially (FIG. 4), the blank 50 lies on the lower die 54, whose shape is complementary to that of the reinforcement element 7 to be formed. Owing to the radiuses of curvature of the reinforcement element 7, which are reflected in the lower die 54, the contact between the blank 50, which has not been shaped yet, and the lower die 54 is minimized, so that the heat transfer from the blank 50 to the lower die 54 is reduced.

Figure 5:
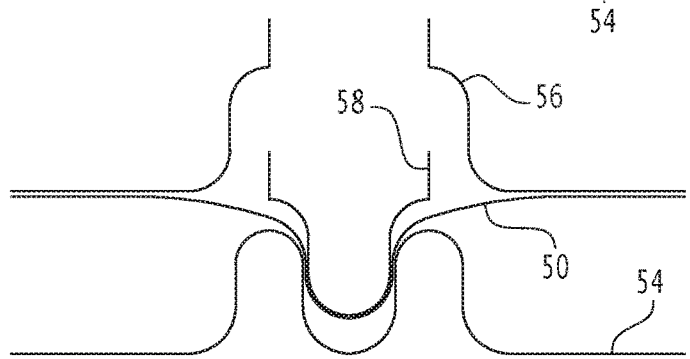
Figure 6:
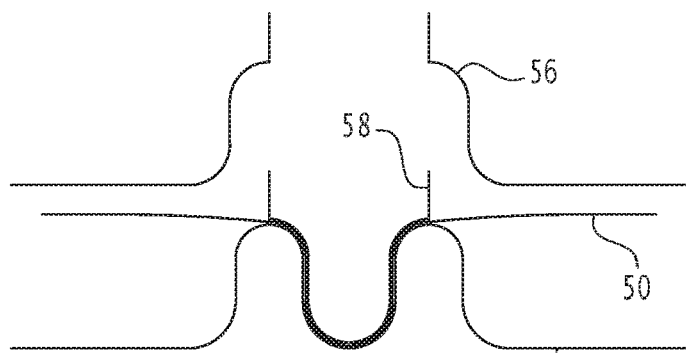
Figure 7:
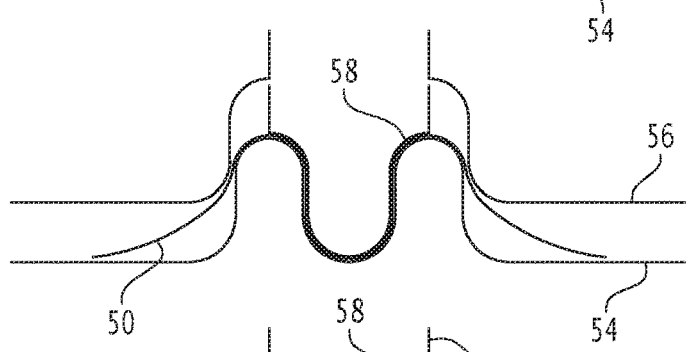
Figure 8:
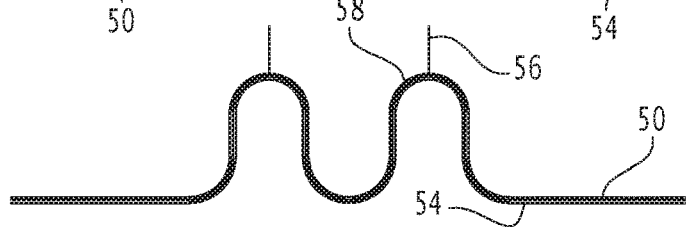

The punch 58, which has a shape substantially complementary to a part of the reinforcement element 7, from the second to the sixth branches, is pressed on the blank 50 in order to shape these branches (FIGS. 5 and 6).

As shown on FIGS. 5 and 6, owing to the radiuses of curvature of the reinforcement element 7, which are reflected in the lower die 54 and the punch 58, the contact surface between the blank 50 on the one hand, and the punch 58 and the lower die 54 on the other hand, is practically reduced to the areas of the blank which have already been shaped or which are being shaped. Therefore, during this step, the heat transfer from the areas of blank 50 which have not been shaped yet to the lower die 54 and the punch 58 is reduced.

The whipper die 56 is then pressed on the blank 50 so as to shape the first branch with the first arcuate junction, and the seventh branch with the sixth arcuate junction. During this step, as shown on FIGS. 7 and 8, the contact surface between the blank 50 and the whipper die 56, is also practically reduced to the areas of the blank 50 which have already been shaped or which are being shaped.

After hot stamping, the reinforcement element is cooled down to ambient temperature at a cooling rate superior to or equal to 27° C./s in order to obtain a structure consisting of martensite.

In particular, the cooling rate is chosen so as to avoid the formation of ferrite in the regions forming the junctions between the branches 42. Indeed, these regions are the ones which are the most deformed during hot stamping, so that the formation of ferrite could occur in these regions.

Since the heat transfer between the press 52 and the areas of the heated blank 50 which have not been shaped yet is reduced, the microstructure and thus the mechanical properties of the reinforcement element 7 are controlled and uniform.

For example, several reinforcement elements 7 may be produced by stamping a blank and then cutting the stamped blank so as to form the reinforcement elements, the cut-off line being located between two adjacent legs 44a, 44b of two distinct reinforcement elements 7.

Alternatively, the legs 44a, 44b have a structure comprising martensite, bainite and optionally ferrite, the rest of the main portion 30 having a structure consisting of martensite. Thus, having legs 44a 44b with a structure comprising martensite, bainite and optionally ferrite makes the cutting easier.

Indeed, when several reinforcement elements 7 are produced by stamping a blank and then cutting the stamped blank, having legs 44a 44b with a structure comprising martensite, bainite and optionally ferrite makes the cutting easier.

The different structures within the reinforcement element 7 may be obtained by applying to the legs 44a, 44b, during the stamping, a temperature different to the temperature applied to the rest of the main portion 30.

The use of a steel with a tensile strength higher than or equal to 1300 MPa allows improving the protection against side impacts provided by the reinforcement element 7. Moreover, the use of a press hardening steel provides both a good formability for the blank so that it may be hot stamped to shape the reinforcement element 7 without obtaining cnecking or thickening of the steel, and a high strength for the reinforcement element 7 once hot stamped.

Owing to the folded geometry of the main section, when the reinforcement element 7 is subjected to an impact, the reinforcing cross-section 40 first unfolds at the impact site, before the reinforcement element 7 bends. Thus, the reinforcement element may absorb an important amount of energy before bending.

Even though the door assembly 3 of the exemplary embodiment is a front driver-side door of a passenger vehicle, the door assembly could alternatively be configured for use as passenger side or for rear vehicle doors. The door assembly 3 may also be configured to be applied to the full range of segments of passenger vehicles as well as other types of vehicles including, for example, pick-up trucks, sport utility vehicles, trucks, personal transport vehicles.

According to another embodiment, each angle formed by two successive branches has a sign opposite to the sign of each adjacent angle. That is, each branch 42 adjacent to two other branches forms with these two branches two angles having opposite signs. The reinforcing cross-section may for example have the shape of a W.

What is claimed is:

1. A reinforcement element for reinforcing a structure of a door of a vehicle, said reinforcement element extending along a main direction and comprising:
   at least a main portion having a reinforcing cross-section extending in a plane perpendicular to the main direction,
   wherein the reinforcing cross-section comprises seven adjacent branches, each extending in different directions, two successive branches forming a non-zero angle, at least two of said non-zero angles being of opposite signs,
   said adjacent branches comprising a first branch, a second branch, a third branch, a fourth branch, a fifth branch, a sixth branch and a seventh branch, said first branch forming with said second branch a first non-zero angle, said second branch forming with said third branch a second non-zero angle, the third branch forming with the fourth branch a third non-zero angle, the fourth branch forming with the fifth branch a fourth non-zero angle, the fifth branch forming with the sixth branch a fifth non-zero angle and the sixth branch forming with the seventh branch a sixth non-zero angle,
   the first non-zero angle and the second non-zero angle being of a same first sign, said third and fourth non-zero angles being of a second sign opposite to the first sign, and the fifth and sixth non-zero angles being of the first sign,
   the first branch and the second branch being joined together by a first arcuate junction, the second branch and the third branch being joined together by a second arcuate junction, the radiuses of curvature of said first arcuate junction and said second arcuate junction being comprised between 5 mm and d/2, wherein d is a distance between said first branch and said third branch,
   the third branch and the fourth branch being joined together by a third arcuate junction, the fourth branch and the fifth branch being joined together by a fourth arcuate junction, the fifth branch and the sixth branch being joined together by a fifth arcuate junction, and the sixth branch and the seventh branch being joined together by a sixth arcuate junction, the first, second and third branches together forming a concave curve oriented towards a first direction, the third, fourth and fifth branches together forming a concave curve oriented towards a second direction opposite the first direction, the fifth, sixth and seventh branches together forming a concave curve oriented towards the first direction, the reinforcing cross-section further comprising two legs joined respectively to the first branch and to the seventh branch and forming with the first branch and the seventh branch respectively non-zero angles, the legs having a structure comprising martensite, bainite and optionally ferrite, the rest of the main portion having a structure consisting of martensite.

2. The reinforcement element as recited in claim 1 wherein said first branch extends in a first plane, the second branch extends in a second plane, and the third branch extends in a third plane, the first plane and the second plane intersecting along a first intersection line, and the second plane and the third plane intersecting along a second intersection line, the first and second intersection lines being parallel, and wherein d is the distance between the first intersection line and the second intersection line.

3. The reinforcement element as recited in claim 1 wherein at least part of the main portion is made of a press hardening steel having a tensile strength higher than or equal to 1300 MPa.

4. The reinforcement element as recited in claim 3 wherein the press hardening steel is Usibor®.

5. The reinforcement element as recited in claim 1 wherein the non-zero angles are comprised, in absolute value, between 80° and 90°.

6. The reinforcement element as recited in claim 1 wherein the radiuses of curvature of said first arcuate junction and said second arcuate junction are comprised between 5 mm and 15 mm.

7. The reinforcement element as recited in claim 1 wherein at least one of the branches has a varying length along the main direction and/or at least one of the angles of the reinforcing cross-section has a varying absolute value along the main direction.

8. A door assembly of a vehicle, comprising a door structure including a window frame and a door panel, wherein the door assembly further comprises a reinforcement element as recited in claim 1 extending across the door panel.

9. The door assembly as recited in claim 8 wherein the door structure is made of a metallic material different from the material of the reinforcement element.

10. The door assembly as recited in claim 8 wherein the door panel is delimited by a front edge, a rear edge parallel to the front edge, a lower edge and an upper edge, the lower edge and the upper edge extending between ends of the front edge and the rear edge, said upper edge defining an edge of the window frame, the reinforcement element extending from the front edge to the rear edge between the upper edge and the lower edge and being parallel to the upper edge.

11. A vehicle comprising a door assembly as recited in claim 8.

12. A method for producing the reinforcement element as recited in claim 1 comprising the following steps:

hot stamping the reinforcement element blank to shape the reinforcement cross section of the main portion, cooling down the reinforcement element at a cooling rate superior to or equal to 27° C./s in order to obtain the structure consisting of martensite.

* * * * *